United States Patent
Hofer et al.

(10) Patent No.: US 11,218,002 B2
(45) Date of Patent: Jan. 4, 2022

(54) BATTERY SYSTEM COMPRISING REAL-TIME CLOCK TO WHICH POWER IS SUPPLIED INTERNALLY, AND POWER SUPPLY CIRCUIT FOR REAL-TIME CLOCK

(71) Applicant: Samsung SDI Co., Ltd., Yongin-si (KR)

(72) Inventors: Maximilian Hofer, Hartberg (AT); Thomas Korherr, Hartberg (AT)

(73) Assignee: Samsung SDI Co., Ltd., Yongin-si (KR)

( * ) Notice: Subject to any disclaimer, the term of this patent is extended or adjusted under 35 U.S.C. 154(b) by 168 days.

(21) Appl. No.: 16/329,702

(22) PCT Filed: Oct. 18, 2017

(86) PCT No.: PCT/KR2017/011492
§ 371 (c)(1),
(2) Date: Feb. 28, 2019

(87) PCT Pub. No.: WO2018/080087
PCT Pub. Date: May 3, 2018

(65) Prior Publication Data
US 2019/0199105 A1 Jun. 27, 2019

(30) Foreign Application Priority Data

Oct. 26, 2016 (EP) ..................................... 16195685
Oct. 16, 2017 (KR) ........................ 10-2017-0134129

(51) Int. Cl.
*H02J 7/00* (2006.01)
*H01M 10/42* (2006.01)
(Continued)

(52) U.S. Cl.
CPC ............ *H02J 7/0014* (2013.01); *B60L 53/22* (2019.02); *B60L 58/22* (2019.02); *G04G 19/00* (2013.01);
(Continued)

(58) Field of Classification Search
USPC ......................................................... 320/125
See application file for complete search history.

(56) References Cited

U.S. PATENT DOCUMENTS 5,905,365 A * 5/1999 Yeh ........................... H02J 9/00
320/166
2002/0044530 A1 4/2002 Oohara et al.
(Continued)

FOREIGN PATENT DOCUMENTS

| CN | 2874897 Y | 2/2007 |
|---|---|---|
| CN | 102200779 A | 9/2011 |

(Continued)

OTHER PUBLICATIONS

Extended European Search Report for corresponding European Application No. 16195685.9, dated Apr. 19, 2017, 8 pages.
(Continued)

*Primary Examiner* — Samuel Berhanu
(74) *Attorney, Agent, or Firm* — Lewis Roca Rothgerber Christie LLP (57) ABSTRACT

Embodiments of the present invention relate to a battery system with internally powered real time clock, the battery system includes a plurality of battery cells connected in series and/or in parallel between a first terminal and a second terminal and a real time clock electrically connected to a first node of the plurality of battery cells, a voltage of a single battery cell of the plurality of battery cells applies to the first (Continued)

node, and the real time clock draws power via the first node in a first operation state and in a second operation state of the battery system.

15 Claims, 5 Drawing Sheets

(51) Int. Cl.
| | |
|---|---|
| *G06F 1/32* | (2019.01) |
| *G06F 1/14* | (2006.01) |
| *B60L 53/22* | (2019.01) |
| *B60L 58/22* | (2019.01) |
| *G04G 19/00* | (2006.01) |
| *B60L 58/10* | (2019.01) |

(52) U.S. Cl.
CPC ............... *G06F 1/14* (2013.01); *G06F 1/32* (2013.01); *H01M 10/425* (2013.01); *H01M 10/4257* (2013.01); *B60L 58/10* (2019.02)

(56) References Cited

U.S. PATENT DOCUMENTS

| | | | |
|---|---|---|---|
| 2002/0167291 A1 | 11/2002 | Imai et al. | |
| 2007/0074056 A1 | 3/2007 | Gottlieb | |
| 2007/0101171 A1 | 5/2007 | Morisawa | |
| 2007/0278861 A1* | 12/2007 | Lou .......................... | G05F 1/56 307/66 |
| 2009/0113222 A1* | 4/2009 | Lee .......................... | G06F 1/14 713/322 |
| 2011/0022864 A1* | 1/2011 | Haiplik ..................... | G06F 1/14 713/322 |
| 2012/0327749 A1 | 12/2012 | Tsukamoto et al. | |
| 2013/0187605 A1 | 7/2013 | Potts | |
| 2014/0197690 A1 | 7/2014 | Koo | |
| 2015/0067379 A1* | 3/2015 | Tashima ................ | G01R 31/392 713/340 |
| 2015/0082065 A1 | 3/2015 | Bose et al. | |
| 2015/0137824 A1* | 5/2015 | Nishihara ............... | B60L 58/15 324/434 |
| 2015/0295426 A1 | 10/2015 | Hirosawa et al. | |
| 2015/0362987 A1 | 12/2015 | Shin et al. | |
| 2016/0233698 A1* | 8/2016 | Gong ..................... | H02J 7/0016 |

FOREIGN PATENT DOCUMENTS

| | | |
|---|---|---|
| CN | 102841668 A | 12/2012 |
| CN | 103944206 A | 7/2014 |
| CN | 105720678 A | 6/2016 |
| GB | 2472030 A | 1/2011 |
| JP | 2002-222030 A | 8/2002 |
| JP | 2010-9511 A | 1/2010 |
| JP | 2013-8167 A | 1/2013 |
| JP | 2016-78615 A | 5/2016 |
| KR | 10-2009-0044087 A | 5/2009 |
| KR | 10-2014-0093063 A | 7/2014 |

OTHER PUBLICATIONS

Chinese Office Action, with English translation, dated Sep. 3, 2021, issued in corresponding Chinese Patent Application No. 201780058597.7 (25 pages).

* cited by examiner

BATTERY SYSTEM COMPRISING REAL-TIME CLOCK TO WHICH POWER IS SUPPLIED INTERNALLY, AND POWER SUPPLY CIRCUIT FOR REAL-TIME CLOCK

CROSS-REFERENCE TO RELATED APPLICATION(S)

This application is a National Phase Patent Application of International Patent Application Number PCT/KR2017/011492, filed on Oct. 18, 2017, which claims priority of European Patent Application No. 16195685.9, filed Oct. 26, 2016 and Korean Patent Application No. 10-2017-0134129, filed Oct. 16, 2017. The entire contents of all of which are incorporated herein by reference.

TECHNICAL FIELD

The present invention relates to a battery system with internally powered real time clock and to a power supply circuit for a real time clock.

BACKGROUND ART

A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g. cylindrical or rectangular, depends on the battery's intended purpose.

Rechargeable batteries may be used as a battery module formed of a plurality of unit battery cells coupled in series and/or in parallel so as to provide a high energy density, e.g. for motor driving of a hybrid vehicle. That is, the battery module is formed by interconnecting the electrode terminals of the plurality of unit battery cells depending on a required amount of power and in order to realize a high-power rechargeable battery, e.g. for an hybrid vehicle. One or more battery modules are mechanically and electrically integrated, equipped with a thermal management system and set up for communication with one or more electrical consumers in order to form a battery system.

For meeting the dynamic power demands of various electrical consumers connected to the battery system a static control of battery power output and charging is not sufficient. Thus, steady or intermittent exchange of information between the battery system and the controllers of the electrical consumers is required. This information exchanged between the battery system and the electrical consumers includes the battery systems state of charge (SoC), potential electrical performance, charging ability and internal resistance as well as actual or predicted power demands or surpluses of the consumers.

Various control and communication processes regarding the battery system, its constituents or the electric consumers are time dependent processes. Monitoring and controlling the charging of battery cells might e.g. require the determination of the rate of change of the state of charge. Further, also in idle periods of the electric consumers, i.e. in periods of minimal load, various parameters, e.g. battery voltages and internal resistances, must be periodically controlled during wake up periods to avoid a system failure, e.g. due to a thermal runaway or short circuits of individual cells. In order to provide a time scale, e.g. for the wake up, the control electronics, i.e. a battery monitoring unit (BMU) and/or a battery management system (BMS), of the battery system comprise a real time clock (RTC).

The real time clock is usually provided as an integrated circuit (IC) and may comprise a crystal oscillator or may use the power line frequency for deriving the time scale. The RTC must be continuously energized in order to keep track of running time and may further comprise a volatile or non-volatile memory in order to keep time related information such as calendar date. Therefore, for security reasons an alternate power source for driving the RTC, e.g. a lithium button cell battery or a capacitor, might be provided additionally to a primary power source.

In battery systems, e.g. in a battery system of an electric vehicle, a low-dropout regulator (LDO) is frequently used for supplying power to the RTC. An LDO is an active linear voltage regulator that dissipates power in order to regulate the output voltage. Hence, the power consumption of an LDO is high. This is disadvantageous particularly with respect to the extended idle times of electric vehicles. Further, the purchase costs for commercial LDOs are high.

DISCLOSURE

Technical Problem

It is an object of exemplary embodiments of the present invention to provide a battery system and a power supply circuit for a real time clock (RTC) for providing an alternative power supply for the RTC of the battery system, lowering a power consumption of the battery system during idle periods while guaranteeing a secure power supply to the RTC in all operating states of the battery system and the RTC, and reducing production costs of the battery system.

Technical Solution

According to a first aspect of the present invention for solving the above problems, a battery system with internally powered real time clock is provided that comprises a plurality of battery cells connected in series and/or in parallel between a first terminal and a second terminal of the plurality of battery cells. In other words, a voltage corresponding to the added voltage of the battery cells connected in series applies between the first terminal and the second terminal. The first terminal and the second terminal may be terminals of a battery module.

The battery system further comprises a real time clock (RTC) that is electrically connected to a first node of the plurality of battery cells. Preferably the RTC is an integrated circuit providing the functionality of a common RTC. The first node of the plurality of battery cells is defined in that the voltage of a single battery cell applies to the first node, e.g. between the first node and ground. Preferably, the single battery cell is connected between the first node and the first or second terminal of the plurality of battery cells and the voltage of the single battery cell applies between one of the first and second terminals and the first node. Alternatively, the first node is connected to a first clamp and a second clamp, wherein the single battery cell is connected between the first clamp and the second clamp. The first node may be connected to any of the plurality of battery cells. According to the first aspect of the present invention, the real time clock draws power via the first node in a first operation state and in a second operation state of the battery system. In other words, in the first operation state and the second operation state, the single battery cell may supply the RTC at all times.

In the battery system, the RTC may be energized by power supplied by the single battery cell of the battery system. According to this embodiment, any active regulators or active switching means between the single battery cell and the RTC are omitted. The RTC passively draws power from the single battery cell according to an actual power demand. As no active elements are arranged between the single battery cell and the RTC solely the load of the RTC may be burden on the single battery cell. Due to the low power consumption of modern RTCs, balancing between the single battery cell and the remaining battery cells of the battery system can be omitted.

Preferably, in the battery system, passive elements are used to adapt the output voltage of the single battery cell to the input voltage requirements of the RTC. Particularly preferred ohmic resistances and/or diodes are used to lower the output voltage of the single battery cell. Due to the small currents drawn by the RTC, the voltage drop over these passive elements can be set to be minimal.

According to a preferred embodiment, the battery system further comprises a control unit that is electrically connected to at least one of the first terminal and the second terminal of the plurality of battery cells. Further, a voltage corresponding to the added voltage of the battery cells connected in series between the first terminal and the second terminal applies to an input of the control unit. In other words, the control unit is configured for receiving an input voltage from the plurality of battery cells via at least one of its inputs. According to this embodiment, the real time clock is electrically connected to a first output of the control unit and draws power via the first node in the first operation state of the battery system and draws power via the first node and via the first output of the control unit in the second operation state of the battery system. Hence, the real time clock can draw more power in the second operation state than in the first operation state without any active switching. The RTC passively draws additional power in the second operation state from the first output of the control unit.

Particularly preferred, the control unit is inactive in the first operation state and is active in the second operation state of the battery system. The first operation state of the battery system is an idle or sleep mode of the control unit and further preferred an idle or sleep mode of the whole battery system. The second operation state preferably is an active state of the battery system. The active state of the battery system might occur during charging, while providing power to a load or during intermittently occurring system wake ups for control purposes. The active state is characterized in that the active control unit is configured for providing at least one supply voltage via at least one output. Thus, the real time clock can draw power from a single battery cell in the first operation state and can draw power from that single battery cell and from an output of the active control unit in the second operation state. Thus, power demand of the RTC can be met in both operation states without any active switching in the power supply circuit of the RTC.

In a further preferred embodiment, the control unit is configured for transmitting control information to the real time clock during the second operation state of the battery system. In other words, the active control unit might actively read out or (re-)program the RTC during the second operation state. The real time clock is configured for receiving and processing the control information from the control unit, by what the power consumption of the RTC increases. In order to meet the increased power demand of the RTC during communication with the control unit in the second operation state, the RTC (passively) draws power from the single battery cell and from a supply power output (first output) of the control unit.

In a particularly preferred embodiment, the second operation state of the battery system occurs during wake ups of the control unit for control purposes, e.g. for measuring voltages and internal resistances of the battery system. According to this embodiment, the real time clock is configured for transmitting a wake up signal to the control unit in the first operation state of the battery system and the control unit is configured for transferring the battery system to the second operation state in response to the wake up signal. The wake up signal may be based on the clock signal of the RTC and also may occur periodically. Preferably the battery system further comprises an energy storage element that is configured for supplying power to the real time clock. The energy storage element ensures that the RTC is capable of transmitting the wake up signal to the control unit in the first operation state of the battery system. The energy storage element may be a condenser with suitable capacity that can be charged during the second operation state of the battery system.

Due to the low power consumption of modern RTCs, the load of the RTC has little effect on balancing between the single battery cell and the remaining battery cells of the battery system. However, the RTC may produce a higher load on the connected single battery cell and thus some unbalanced discharge of the single battery cell may occur. Exemplarily, considering an RTC with a nominal current consumption of 600 nA, over the battery system's total life time of approximately 15 years a total charge misbalance of 15 a*365.25 day*24 h*600 nA=78.9 mAh results. If one considers a balancing current not more than 55 mA, a total balancing time of 78.9 mAh/55 mA=1.43 h is required. Further considered that each individual battery cell of the plurality of battery cells can be used for balancing, the total balancing time per cell further reduces. Exemplarily for a total of twelve battery cells a balancing time of 7.15 min per cell is resulting. In other words, the discharge of the single battery cell by the RTC is negligible and active balancing is not mandatorily required.

However, according to a further preferred embodiment the battery system may comprise an active balancing unit that is electrically connected to the first node of the plurality of battery cells and that is configured for supplying power to the single battery cell. Preferred, the active balancing unit is electrically connected to a second output of the control unit and comprises a step-down converter, e.g. a buck converter. Thus, the active balancing unit is fed with another supply voltage of the control unit that may be higher than the supply voltage that is supplied to the first output of the control unit. Hence, the active balancing unit can recharge the single battery cell during the second operation state of the battery system.

In a preferred embodiment of the battery system according to the first aspect of the present invention, the plurality of battery cells, the control unit and the real time clock are arranged in a common housing. Thus, the RTC and the control unit are integrated in the battery system. Advantageously this packaging increases security and robustness and decreases wiring resistance and complexity of the battery system. Further preferred, the control unit and the real time clock are arranged on a common circuit carrier. Thus, wiring resistance and complexity and temperature differences between RTC and control unit are further reduced.

A second aspect of the present invention relates to a power supply circuit for a real time clock, comprising a central node that is electrically connected to a power input of the real time clock and a first node that is electrically connected to the central node. According to the second aspect of the present invention, a plurality of battery cells are connected in parallel and/or in series between a first terminal and a second terminal and a single battery cell is connected between the first node and the first terminal or the second terminal of the plurality of battery cells. Thus, the voltage of the single battery cell applies to the first node. The power supply circuit provides a simple design for powering an RTC by utilizing an outermost battery cell of a battery cell stack. Considering the low power consumption of modern RTCs, the discharge of this outermost battery cell is negligible. Hence, in designing the power supply circuit, alternative power sources for the RTC, balancing means and/or active switching means can be omitted. Thus, the power supply circuit has minimal power consumption and reduced production costs. Alternatively, the first node is connected to a first clamp and to a second clamp and the single battery cell is connected between the first and second clamp. In this case, an arbitrary battery cell may be used instead of the outermost cell to supply power to the RTC.

In a preferred embodiment, the power supply circuit according to the second aspect of the present invention further comprises a second node that is electrically connected to the central node and to a first output of a battery system control unit, wherein the battery system control unit is electrically connected to one of the first terminal and the second terminal of the plurality of battery cells and provides a supply voltage via its first output. Thus, the power supply circuit comprises another port for supplying power to the central node and hence the RTC connected to the central node can draw power from the single battery cell and from the first output of the battery system control unit. The battery system control unit might be a battery management system (BMS), a battery monitoring unit (BMU) or a comparable microcontroller.

Further preferred, the power supply circuit according to the second aspect of the present invention further comprises an energy storage element. The energy storage element is electrically connected to the central node and is configured for supplying power to the real time clock. The RTC uses the additional power for generating a wake up signal and transmitting the wake up signal to the battery system control unit. In other words, the energy storage element relieves the single battery cell in the first operation mode and ensures dynamic supply of sufficient energy during wake up. Although active balancing can be omitted in the second aspect of the present invention, the power supply circuit can further comprise an active balancing unit that is electrically connected between the first node and a second output of the battery system control unit. The active balancing unit is fed with a supply voltage different from that supplied to the first output of the battery system control unit, preferably with a higher supply voltage than that supplied to the first output of the battery system control unit. Particularly preferred, the active balancing unit comprises a step-down converter, e.g. a buck converter.

Further preferred, the power supply circuit further comprises at least one ohmic resistance connected between the first node and the central node. These ohmic resistances provide a voltage drop and thus adapt the output voltage of the single battery cell to the required input voltage of the RTC. Also preferred, the power supply circuit further comprises a diode connected between the first output of the control unit and the second node. This diode prevents current, e.g. from the single battery cell, to flow into the control unit during the first operation state. The power supply circuit preferably comprises at least one ohmic resistance connected between the step-down converter of the active balancing unit and the first node for adapting the output voltage of the step down converter to a required charging voltage of the single battery cell. In the power supply circuit, as solely passive components are used for these functions power losses are reduced and switching noise is omitted.

A third aspect of the present invention relates to a method for operating a real time clock of a battery system, the battery system comprising a plurality of battery cells that are connected in series and/or in parallel between a first terminal and a second terminal of the plurality of battery cells, The method is comprising the step of supplying power to the real time clock from a single battery cell of the plurality of battery cells in a first operation state and in a second operation state of the battery system. Therein a control unit that is electrically connected to one of the first and the second terminal is inactive in the first operation state and active in the second operation state of the battery system. In the method, the RTC draws power from the single battery cell in both operation states of the control unit, preferably in both operation states of the battery system. Preferably the first operation state of the control unit is a sleep mode of the control unit and further preferred of the whole battery system. In the first operation state, i.e. the sleep mode, the RTC is preferably solely supplied by the single battery cell. According to the method, no active elements, e.g. active elements of the control unit, are involved in power supplying the RTC and thus power losses and switching noise in the active elements is omitted.

Further preferred, the method according to the third aspect of the invention further comprises the step of supplying power to the real time clock from the single battery cell and a first output of the control unit in a second operation state of the battery system. In the second operation state, which is an active state of the battery system and of the control unit, the RTC is supplied by the single battery cell and by the first output of the control unit. In the second operation state, the control unit receives an input voltage from the plurality of battery cells and provides a supply voltage via the first output. Hence, the RTC can passively draw more power and can thus meet its increased power demands without the need for active switching elements.

In a further preferred embodiment, the method according to the third aspect of the invention further comprises the step of drawing power from an energy storage element by the real time clock for transmitting a wake up signal to the control unit in the first operation state of the battery system and the step of switching the battery system to the second operation state by the control unit in response to the wake up signal. In other words the RTC wakes up the control unit at a predetermined time or after a predetermined time period based on its internal time scale by outputting the wake up signal to the control unit. As the RTC normally draws power solely from the single battery cell in the first operation state, the generation of the wake up signal could lead to an undersupply of the RTC and thus to a loss of the internal time scale. To avoid this, the energy storage element can provide additional power for a short time period of generating and transmitting the wake up signal. Further preferred, the method comprises the step of charging the energy storage element in the second operation state of the battery system via the first output of the control unit. In the second operation state, the first output of the active control unit is energized and the energy storage element can be filled before the next first operation state of the battery system is initiated by the control unit.

Further preferred, the method according to the third aspect of the invention comprises the step of transmitting control information from the control unit to the real time clock during the second operation state of the battery system, the step of receiving and processing the control information in the real time clock and the step of transmitting an response information to the control unit by the real time clock in response to the control information. These steps effect an increased power consumption of the RTC during the second operation state of the control unit that actively communicates with the RTC. The increased power demand is covered by the active control unit as the RTC can draw power from the first output of the active control unit.

Depending on the power demand of the RTC, particularly during the second operation state of the battery system, misbalanced discharge of the single battery cell occurs that might decrease the capacity of the battery system. Thus, in a preferred embodiment the method further comprises the step of supplying power to the single battery cell in the second operation state of the battery system from an active balancing unit. Therein, the active balancing unit is electrically connected to a second output of the control unit and comprises a step-down converter. Preferably the control unit provides a supply voltage to its second output that might be equal or higher than the first output voltage supplied to the first output. Particularly preferred, the active balancing unit is configured for balancing the single cell supplying power to the RTC with the remaining cells of the plurality of battery cells, particularly preferred with a selected one of the plurality of battery cells. Thus, the charge loss of the single battery cell due to supplying power to the RTC in both operation states can be actively balanced during the second operation state. The active balancing unit is preferably inactive in the first operation state, wherein the outputs of the control unit are not energized.

Further preferred, the control unit of the battery system is configured for performing the method according to the third aspect of the present invention. A further aspect of the invention relates to a vehicle including a battery system, as defined above.

Advantageous Effects

According to embodiments of the present invention, it is possible to lower a power consumption of a battery system during idle periods and to reduce production costs of the battery system while guaranteeing a secure power supply to a RTC in all operating states of the battery system and the RTC.

MODE FOR INVENTION

Hereinafter, various exemplary embodiments will be described in detail so that those skilled in the art can easily carry out the present invention with reference to the accompanying drawings. The exemplary embodiments may be implemented in a variety of different forms and are not limited to the exemplary embodiments described herein.

For clear illustration of the exemplary embodiments, parts not related to the description are omitted, and the same reference numerals are used throughout the specification for the same or similar constituent elements. Therefore, the reference numbers of the constituent elements used in previous drawings can be used in following drawings.

The method to electrically connect two constituent elements includes not only a direct connection of two components, but also a connection between two components through a different component. The different component may be a switch, resistor, capacitor, and the like. In describing the embodiments, the expression "connect" means to electrically connect when there is no expression of "directly connect".

Figure 1:
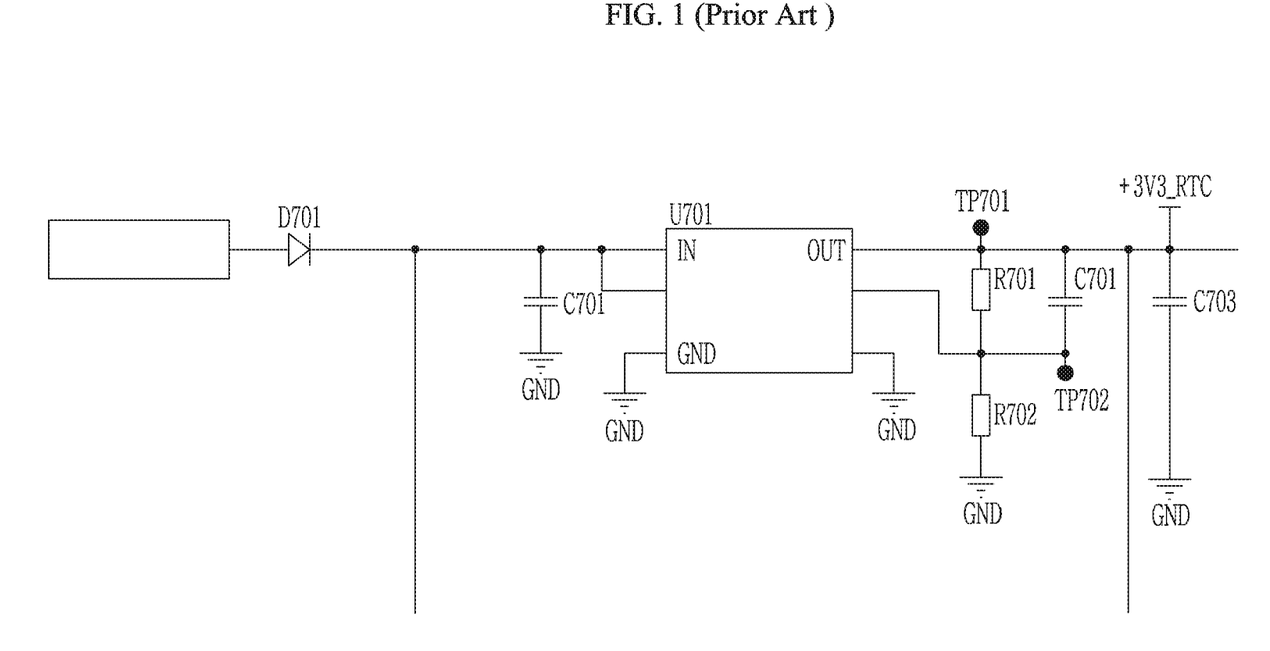
FIG. 1 illustrates a schematic circuit diagram of a power supply circuit of a real time clock according to the prior art.

FIG. 1 shows a schematic circuit diagram of a power supply circuit of a real time clock according to the prior art.

Referring FIG. 1, an input voltage CL30 of LDO linear voltage regulator U701 is provided to the anode of diode D701 and the cathode of diode D701 is electrically connected with a first input of LDO U701. The input voltage CL30 of LDO U701 may be supplied from at least one cell of a plurality of battery cells (not shown). Further inputs of LDO U701 are supplied with ground voltage GND. A condenser C701 is connected in parallel to LDO U701 and functions as low-pass for conducting HF parts of the battery voltage to ground. A first output of LDO U701 is electrically connected to a +3V3_RTC node and hence, in a certain range of cell voltage a substantially constant RTC voltage of 3.3 V is provided to the +3V3_RTC node.

Figure 2:
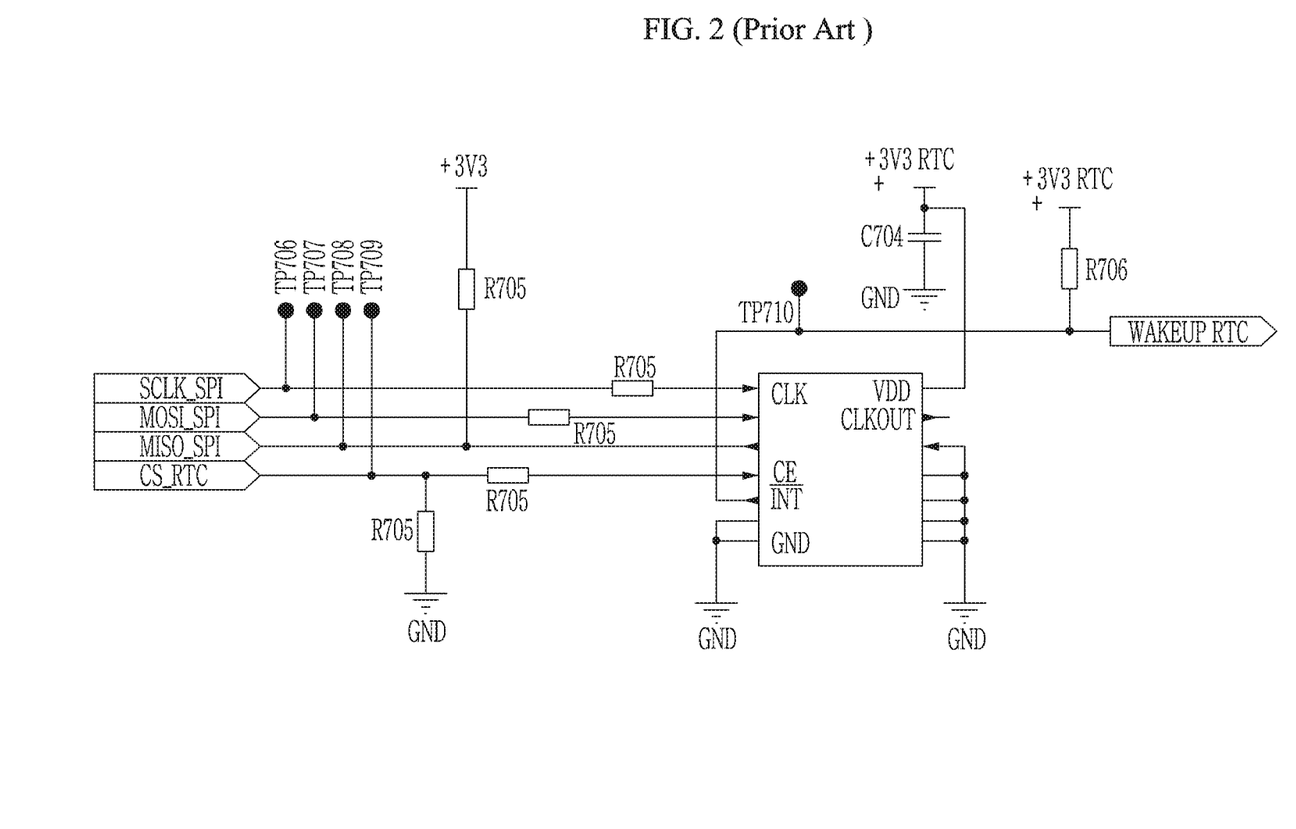
FIG. 2 illustrates a schematic connection diagram of a real time clock according to the prior art.

FIG. 2 illustrates a schematic connection diagram of a real time clock U702 according to the prior art, wherein the +3V3_RTC node shown in FIG. 1 is connected to various nodes shown in FIG. 2.

Referring to FIG. 2, for supplying power to the RTC U702, the regulated operation voltage of substantially 3.3 V is provided to the VDD input pin of RTC U702. Thus, the RTC U702 is solely supplied power via the output of LDO U701. The RTC U702 is further electrically connected to ground GND and comprises a plurality of input pins electrically connected to a plurality of serial peripheral interfaces SPI. An output pin CLKOUT of the RTC U702 provides a fixed output frequency as clock signal and an output pin /INT is an open drain output configured to output a wake up signal WAKEUP_RTC. As can be seen from the combination of FIGS. 1 and 2, the LDO U701 must be continuously active in order to provide energy to the RTC U702. Thus, power dissipation occurs constantly in the LDO U701 and lowers the efficiency of the system.

Figure 3:
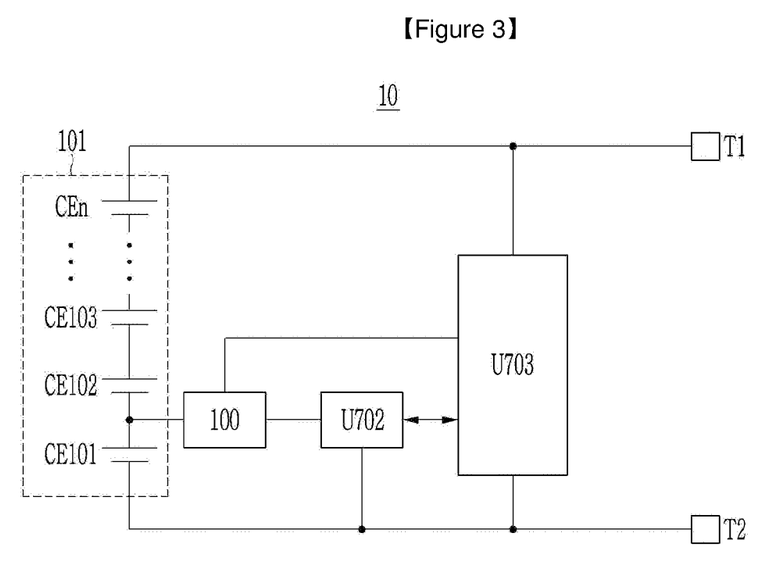
FIG. 3 illustrates a schematic diagram of a battery system according to a first embodiment.
Figure 4:
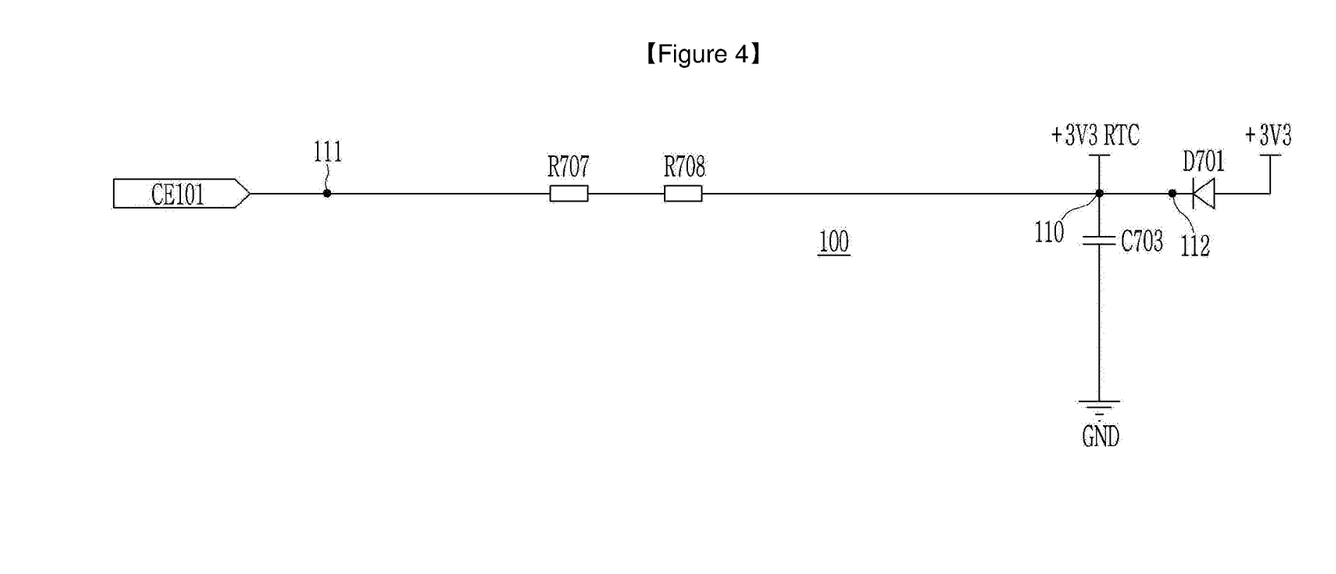
FIG. 4 illustrates a schematic circuit diagram of a power supply circuit of a real time clock according to a first embodiment.

FIG. 3 illustrates a schematic diagram of a battery system 10 according to a first embodiment of the invention, and FIG. 4 illustrates a schematic circuit diagram of a power supply circuit 100 of a real time clock U702 of the battery system 10 according to the first embodiment of the invention.

Referring to FIGS. 3 and 4, a single battery cell CE101 of a plurality of battery cells 101 constituting the battery system 10 is connected with a first node 111 of the power supply circuit 100 such that solely the voltage of the first battery cell CE101 is applied to the first node 111. This is either realized by connecting a first clamp (not shown) and a second clamp (not shown) to the first node 111 and by electrically connecting the single battery cell CE101 between the first clamp and the second clamp. In this case, the output voltage of the single battery cell CE101 may be divided by the first and second clamps, and the divided voltage may be applied to the first node 111. The plurality of battery cells 101 is electrically connected in series and/or in parallel between a first terminal (T1) and a second terminal (T2) and the single battery cell CE101 is electrically connected between one of these terminals and the first node 111.

The first node 111 is electrically connected to a central node 110. A first ohmic resistor R707 with a resistance of 100 kOhm and a second ohmic resistor R708 with a resistance of 100 kOhm may be electrically connected between the first node 111 and the central node 110. The central node 110 is electrically connected to the supply node +3V3_RTC that is electrically connected to the VDD input pin of the RTC U702. The central node 110 is further electrically connected to a second node 112 that is electrically connected with a first output of a control unit U703. The control unit U703 is electrically connected to a plurality of battery cells 101 and supplies a voltage of 3.3 V to its first output while it is active. A diode D701 is electrically connected between the second node 112 and the first output of the control unit U703. Further a condenser C703 is electrically connected as an energy storage element between the central node 110 and GND.

In a first operation state of the battery system 10, the control unit U703 is inactive and thus no voltage is applied to the first output. In this first operation state, the single battery cell CE101 provides a first voltage of approximately 4V to the first node 111. The RTC U702 that is connected to the node +3V3_RTC has a nominal current consumption between 0.6 µA and 1.2 µA as the inactive control unit U703 does not conduct any communication with the RTC U702. Typically, the RTC U702 requires an input voltage of 3.3 V. At a current between 0.6 µA and 1.2 µA, the resistors R707 and R708 effect a voltage drop such that a voltage of approximately 3.3 V applies to the central node 110 and the second node 112. The diode D701 prevents that the inactive control unit U703 functions as current sink. Referring to FIG. 4, a voltage is applied to the node +3V3_RTC via the central node 110 and this voltage is utilized to power the RTC U702. Thus, in the first operation state, the RTC U702 is powered without operating any active switching means and thus power consumption of the battery system 10 comprising the power supply circuit 100 as shown in FIG. 4 is reduced and no switching noise occurs.

The first output of the control unit U703 and thus the second node 112 are set to a supply voltage of 3.3 V if the control unit is active in a second state of a battery system. In the second operation state, the control unit U703 communicates with the RTC U702. That is, the control unit U703 transmits control information to the RTC U702. Receiving and processing the control information as well as transmitting an RTC response to the control unit U703 increases the power demand of the RTC U702. Particularly, the current consumption of the RTC U702 increases at the fixed input voltage of 3.3 V and thus the voltage drop at the resistors R707 and R708 increases. Hence, the single battery cell CE101 is not sufficient to provide the operation voltage to the RTC U702. However, as the control unit U703 is active, it supplies a voltage of 3.3 V to its first output and thus a voltage of approximately 2.6 V is provided to second node 112. Thereby, sufficient power for supplying RTC U702 is provided to the central node 110 via the first node 111 and the second node 112. Thus, the increased power demand of the RTC U702 can be met as it passively draws current via the first node 111 and the second node 112, i.e. the first output of the control unit U703

The condenser C703 comprises a capacity of 2.2 µC and is charged in the second operation state. At the end of the first operation state, the RTC U702 transmits a wake up signal WAKEUP_RTC via output/INT to the control unit U703. The additional power required for generating and transmitting this signal is provided by condenser C703 that is discharged. In response to the wake up signal, the control unit U703 wakes up and thus initiates the second operation state, in which the condenser C703 is again charged. Thus, the RTC U702 is securely power supplied in all of its operation states via the simple power supply circuit 100 as shown in FIG. 4 without any active switching means and thus with increased efficiency.

Figure 5:
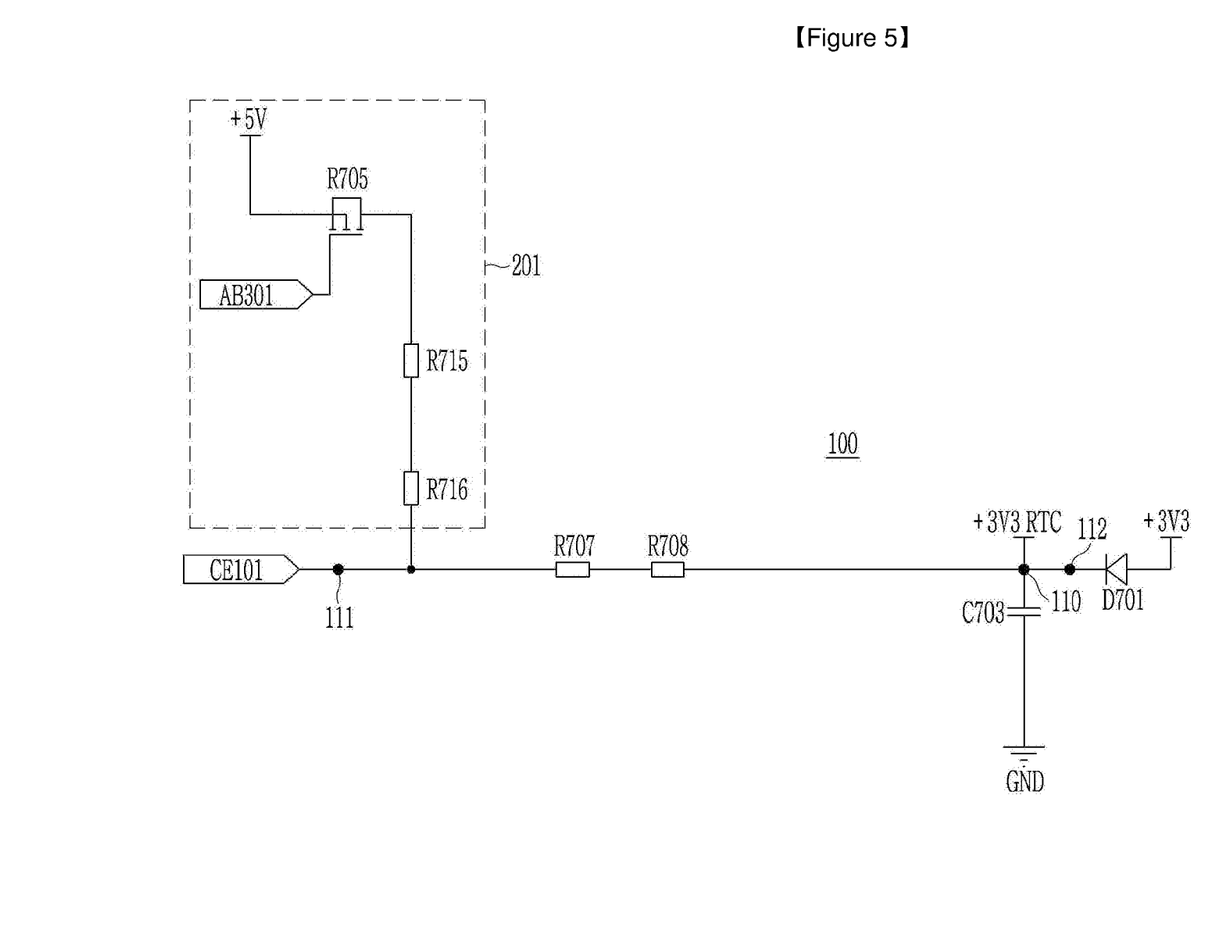
FIG. 5 illustrates a schematic circuit diagram of a power supply circuit of a real time clock according to a second embodiment.

FIG. 5 illustrates a schematic circuit diagram of a power supply circuit 100 of a real time clock RTC U702 of a battery system (not shown) according to a second embodiment of the invention.

Referring to FIG. 5, an active balancing circuit 201 is electrically connected to the power supply circuit 100. The active balancing circuit 201 comprises a n-channel FET R705 (with free-wheeling diode) and a balancing control unit AB301 that controls the gate of the n-channel FET R705. The source of FET R705 is electrically connected to a second output of the control unit (see reference numeral U703 in FIG. 3) that supplies a voltage of 5 V. The drain of FET R705 is electrically connected to the conductor between the first node 111 and the central node 110 via a first ohmic resistor R715 with 24 kOhm resistance and a second ohmic resistor R716 with 24 kOhm resistance. The balancing control unit AB301 sets the conductance of FET R705 dependent on an actual voltage measurement of one or more of the plurality of battery cells (see reference numeral 10 in FIG. 3). The resistors R715 and R716 provide a voltage drop and thus adapt the output voltage of FET R705 to the charging voltage requirements of the single battery cell CE101. The balancing occurs in the second operating state of the battery system (see reference numeral 10 in FIG. 3), while the control unit (see reference numeral U703 in FIG. 3) is active. Thus, misbalancing between the battery cells can be avoided and the nominal capacity of the battery system might be increased. The further components of the power supply circuit 100 are identical to the components of the power supply circuit shown in FIG. 4. and hence their description is omitted.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g. on a PCB or another kind of circuit carrier. The conducting elements may comprise metallization, e.g. surface metallizations and/or pins, and/or may comprise conductive polymers or ceramics. Further electrical energy might be transmitted via wireless connections, e.g. using electromagnetic radiation and/or light.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

The detailed description of the invention described in the drawings and described above is merely illustrative of the present invention, and it is used only for the purpose of describing the present invention and not for restricting the meanings or limiting the scope of the present invention described in the claims. It will therefore be apparent to those skilled in the art that numerous variations and equivalents of other embodiments are possible. Therefore, the true technical protection scope of the present invention should be determined by the technical concepts of the accompanying claims.

DESCRIPTION OF SYMBOLS 10 battery system
100 power supply circuit
101 plurality of battery cells
110 central node
111 first node
112 second node
201 active balancing circuit
+3V3_RTC supply node
CE101 single battery cell
U702 RTC
U703 control unit
R707, R708, R715, R716 resistor
C703 condenser
D701 diode
R705 FET
AB301 balancing control unit

The invention claimed is:

1. Battery system with internally powered real time clock, comprising:
  a plurality of battery cells connected in series and/or in parallel between a first terminal and a second terminal of the plurality of battery cells;
  a real time clock electrically connected to a first node between the first and second terminals of the plurality of battery cells; and
  at least one passive device connected between the first node and the real time clock,
  wherein a voltage of a single battery cell of the plurality of battery cells is applied to the first node,
  wherein the at least one passive device adjusts the voltage applied to the first node,
  wherein the real time clock draws power via the first node in a first operation state and in a second operation state of the battery system, and
  wherein the single battery cell is configured to supply the voltage to the first node in the first operation state and in the second operation state of the battery system.

2. Battery system according to claim 1, further comprising a control unit electrically connected to one of the first terminal and the second terminal,
  wherein the real time clock is electrically connected to a first output of the control unit, and
  wherein the real time clock draws power via the first node in the first operation state of the battery system and draws power via the first node and via the first output of the control unit in the second operation state of the battery system.

3. Battery system according to claim 2,
  wherein the control unit is inactive in the first operation state of the battery system and is active in the second operation state of the battery system.

4. Battery system according to claim 2,
  wherein the control unit is configured for transmitting control information to the real time clock during the second operation state of the battery system, and
  wherein the real time clock is configured for receiving and processing the control information under additional power consumption.

5. Battery system according to claim 2,
  wherein the real time clock is configured for transmitting a wake up signal to the control unit in the first operation state of the battery system, and
  wherein the control unit is configured for transferring the battery system to the second operation state in response to the wake up signal.

6. Battery system according to claim 5, further comprising an energy storage element configured for supplying power to the real time clock for transmitting the wake up signal to the control unit.

7. Battery system according to claim 2, further comprising an active balancing unit electrically connected to the first node of the plurality of battery cells and configured for supplying power to the single battery cell.

8. Battery system according to claim 7,
  wherein the active balancing unit is electrically connected to a second output of the control unit and comprises a step-down converter.

9. Battery system according to claim 2,
  wherein the plurality of battery cells, the control unit and the real time clock are arranged in a common housing, and/or
  wherein the control unit and the real time clock are arranged on a common circuit carrier.

10. The battery system of claim 1, wherein the at least one passive device comprises a resistor.

11. The battery system of claim 1, wherein the at least one passive device comprises a first resistor and a second resistor connected in series between the first node and the real time clock.

12. Power supply circuit for a real time clock, comprising:
a central node electrically connected to a power input of the real time clock and a first node electrically connected to the central node; and
at least one passive device connected between the first node and the central node,
wherein a single battery cell from among a plurality of battery cells connected in series and/or in parallel between a first terminal and a second terminal of the plurality of battery cells is connected between the first node and the first terminal or between the first node and the second terminal to supply a voltage to the first node,
wherein the at least one passive device is configured to adjust the voltage supplied to the first node to power the real time clock, and
wherein the single battery cell is configured to supply the voltage to the first node in an active state and in an inactive state of the power supply circuit.

13. Power supply circuit according to claim 12, further comprising a battery system control unit that is electrically connected to one of the first terminal and the second terminal of the plurality of battery cells and provides a supply voltage to a first output of the battery system control unit; and
a second node electrically connected to the central node and to the first output of the battery system control unit.

14. Power supply circuit according to claim 12, further comprising an active balancing unit electrically connected between the first node and a second output of a battery system control unit and comprising a step-down converter.

15. Power supply circuit for a real time clock, comprising:
a central node electrically connected to a power input of the real time clock and a first node electrically connected to the central node; and
at least one passive device connected between the first node and the central node,
wherein a single battery cell from among a plurality of battery cells connected in series and/or in parallel between a first terminal and a second terminal of the plurality of battery cells is connected between the first node and the first terminal or between the first node and the second terminal to supply a voltage to the first node,
wherein the at least one passive device is configured to adjust the voltage supplied to the first node to power the real time clock, and
wherein the power supply circuit further comprises an energy storage element electrically connected to the central node and configured for supplying power to the real time clock for transmitting a wake up signal to a battery system control unit.

\* \* \* \* \*